United States Patent [19]

Resener

[11] 4,150,278
[45] Apr. 17, 1979

[54] METHODS OF TUNING INDUCTIVE DEVICE BY BEAM-MACHINE ALTERING A CENTRAL AIR GAP THEREOF

[75] Inventor: Baird E. Resener, Warren Township, Somerset County, N.J.

[73] Assignee: Western Electric Company, Incorporated, New York, N.Y.

[21] Appl. No.: 761,084

[22] Filed: Jan. 21, 1977

Related U.S. Application Data

[62] Division of Ser. No. 613,590, Sep. 15, 1975, abandoned.

[51] Int. Cl.² .................... B23K 9/00; H01F 15/02
[52] U.S. Cl. .................... 219/121 LM; 219/121 EM; 336/83
[58] Field of Search .................... 29/593, 602; 219/121 EB, 121 EM, 121 L, 121 LM; 336/83

[56] References Cited

U.S. PATENT DOCUMENTS

| | | | |
|---|---|---|---|
| 1,132,016 | 3/1915 | Jobke | 336/178 X |
| 3,028,660 | 4/1962 | Stratton et al. | 20/155.56 |
| 3,150,340 | 9/1964 | Kalbfell | 336/178 |
| 3,195,086 | 7/1965 | Taylor | 336/83 |
| 3,293,587 | 12/1966 | Robinson | 219/121 EB |
| 3,454,854 | 8/1969 | Booth | 336/83 X |
| 3,472,998 | 10/1969 | Popick et al. | 219/121 L |
| 3,530,573 | 9/1970 | Helgeland | 29/620 |
| 3,546,571 | 12/1970 | Fletcher et al. | 336/178 X |
| 3,548,492 | 12/1970 | Weber | 29/602 |
| 3,597,579 | 8/1971 | Lumley | 219/121 L |
| 3,597,579 | 8/1971 | Lumley | 219/121 |
| 3,670,406 | 6/1972 | Weber | 29/593 |
| 3,689,159 | 9/1972 | Taniguchi et al. | 356/123 |
| 3,699,649 | 11/1969 | McWilliams | 219/121 L |
| 3,766,616 | 3/1972 | Staudte | 29/25.35 |
| 3,827,142 | 8/1974 | Bennett et al. | 219/121 LM X |
| 3,874,075 | 4/1975 | Lohse | 29/602 |

FOREIGN PATENT DOCUMENTS

| | | | |
|---|---|---|---|
| 1166994 | 11/1958 | France. | |
| 1523460 | 5/1968 | France | 336/83 |
| 673267 | 6/1952 | United Kingdom. | |
| 737068 | 9/1955 | United Kingdom. | |

OTHER PUBLICATIONS

Lasers in Industry, pp. 247, 278, 1972, edited by S. S. Charschan.

Primary Examiner—J. V. Truhe
Assistant Examiner—Fred E. Bell
Attorney, Agent, or Firm—K. R. Bergum; R. P. Miller

[57] ABSTRACT

Beam machining methods are disclosed for adjusting the inductance of an inductive device having a core that substantially encloses coil means, and establishes a centrally located air gap. The inductance is adjusted by utilizing a high energy beam for machining a terminating end region of an inwardly extending core leg portion, the end face of which in part defines the air gap. By modifying the geometrical dimensions of the leg portion end face, the reluctance across the air gap may be readily changed by an amount that produces the desired value of inductance exhibited by the device when energized. The disclosed methods advantageously obviate the need for a tuning slug associated with the air gap, and eliminate the need for machine grinding the air gap-defining leg portions of the core prior to the assembly of the device.

19 Claims, 10 Drawing Figures

METHODS OF TUNING INDUCTIVE DEVICE BY BEAM-MACHINE ALTERING A CENTRAL AIR GAP THEREOF

This is a division, of application Ser. No. 613,590 filed Sept. 15, 1975, now abandoned.

BACKGROUND OF THE INVENTION

1. Field of the Invention

This invention relates to methods of adjusting the inductance of inductive devices and, more particularly, to those of the sectioned core type wherein the core substantially enclose the coil means and forms a central air gap within the latter, and to methods of adjusting the inductance of such devices.

2. Description of the Prior Art

In many demanding electronic circuit applications, inductors or transformers often are required which utilize magnetic cores, such as of the ferrite type. As is well known, ferrite cores may be manufactured to exhibit a wide range of magnetic properties for a particular circuit application, such properties ranging from a very high permeability (thereby being readily magnetized) to a very high coercive force (thereby having the capability of retaining magnetism). Ferrites also exhibit very high electrical resistivity, and it is this latter property that makes them particularly useful as cores in many inductive circuit applications when compared to either magnetic iron or alloys. Ferrites are manufactured starting with a desired proportionate mixture of oxides of iron and zinc, together with manganese carbonate, which mixture is thereafter compacted or pressed, and then fired to form the desired rigid geometric core configuration.

While the art of manufacturing ferrites is relatively old, it is nevertheless a rather difficult and complex process, involving a number of critical variables that must be controlled in a very exacting manner in order to attain even reasonable uniformity of product. These variables relate not only to the preciseness of the percentage concentrations of the basic constituents, but to other factors such as the pressing and firing conditions employed during their manufacture, as well as the presence of even small amounts of impurities, and any possible exposure to foreign contamination.

Compounding the problem of achieving uniform electrical and magnetic characteristics in ferrite cores heretofore has been the dimensional variations encountered in the fired cores. More specifically, ferrite cores must initially be pressed into the desired shape with oversized dimensions, typically ranging from ten to twenty per cent, so as to compensate for the subsequent shrinkage thereof during firing. As such, it becomes readily apparent that whenever very close tolerances are required with respect to critical core dimensions, such as an air gap formed in sectioned cores, abrasive machine grinding or lapping operations have often been required heretofore.

Such auxiliary operations are both time consuming and expensive, and have been particularly required in connection with the manufacture of cup-shaped ferrite cores. Each section of such cores is generally formed with a circular end wall, either a continuous or segmented outer annular wall and an axially disposed and inwardly extending tubular leg portion that defines an inner wall. The annular space defined between the inner and outer walls of each core section accommodates a portion of the coil (or coils) surrounding the leg portion thereof, with the latter terminating relative to the end of the mutually disposed leg portion of the mating core section so as to define a pre-established air gap therebetween.

As thus constructed, it is readily appreciated that the relatively thin outer walls of the mating cup-shaped core sections provide a substantially enclosing housing for the coil(s), and an effective, low reluctance return path for magnetic flux. Unfortunately, however, such cup-shaped cores result in the pre-established central air gap being substantially inaccessible for machine grinding after the assembly of the inductive device. It is for this reason that the peripheral annular wall edge and/or the terminating end of the leg portion of at least one of the core sections has had to be machine ground heretofore before their assembly so as to establish an initial air gap, the width of which is within predetermined limits. Only in this way could the initial value of inductance exhibited by the device be expected to fall within a predetermined acceptable range.

However, even with this added expense in device manufacture, the typical tolerance variations encountered in both the coil(s) and core sections have still normally required a ferrite tuning slug (and associated split sleeve) to fine tune the assembled device. Such a slug is employed to adjustably control the reluctance across the air gap and, thereby, the inductance, when the device is used in demanding circuit applications.

Of course, should the initial machine grinding operation not have resulted in the air gap spacing falling within a range that would allow the tuning slug to adjust the inductance of the assembled and energized device within acceptable limits heretofore, either the completely assembled unit has had to be discarded, or the device disassembled, with either one or both of the core sections being subjected to further machine grinding, if practicable, or selectively replaced by new ones. As the core sections are often cemented together during assembly, and as a plurality of coils are generally employed, which typically necessitates that the lead-out wires therefrom be wire-wrapped or solder-connected to associated terminal posts, any disassembly operation has been time-consuming and expensive.

In order to dynamically adjust the inductance of inductive devices utilizing a substantially different core heretofore, namely, a solid ferrite core of the toroidal type, R. L. Weber U.S. Pat. No. 3,548,492 discloses the use of an air stream of abrasive particles to either partially or completely form an initial air gap through an exposed area of such a core in order to change the reluctance of the core and, thereby, the inductance of the device. In assembled inductive devices utilizing cup-shaped cores, however, the terminating ends of the core leg portions that define the central air gap are not readily accessible for machining by a stream of abrasive particles. As such, an abrasive stream could not be effectively utilized either to form such an internal air gap initially, or to modify the air gap after the assembly of the device for the purpose of adjusting the inductance thereof.

Moreover, any attempt to increase the diameter of the bore in one or both tubular leg portions (adapted heretofore to receive a tuning slug) so as to allow an air stream of abrasive particles to be directed therein at a small angle relative to the axis thereof, in an attempt to remove core leg material defining the air gap, would not prove to be very practicable. Such a process would create a substantial amount of detrimental debris in the form of both core material and abrasive particles (as none of such material would be vaporized), and would be relatively slow. In addition to such problems, in order for an abrasive stream to be very effective in removing core material, the angle of incidence thereof should be as low as possible relative to the core surface being machined. In this regard, there is no practical way to deflect an abrasive stream at the requisite angle after entering the bore of one of the core leg portions, at least not with the abrasive stream remaining concentrated and effective for machining purposes.

As for using a stream of abrasive particles to form a partial or complete air gap in an outer exposed area of an enclosing core, the relatively thin outer walls of such core sections do not permit the type of air gap disclosed and appreciated in the Weber patent. Moreover, any attempt to utilize abrasive particles to form any type of slot in such a wall would be very messy, lack precision control over slot definition, render the thin wall-particle-blasted core section particularly susceptible to fracture, and be time consuming.

In Hartwig Lohse U.S. Pat. No. 3,874,075, a high energy beam source is disclosed for cutting a plurality of helical grooves in a metallic coating applied to a solid rectangularly-shaped core so as to produce an inductive device. This reference also suggests that a groove or notch, which may ultimately extend through the core to form a complete air gap, may be employed to adjust the inductance of the device, and that such a notch or air gap may be formed in a region removed from the externally exposed winding by the use of either a high energy beam, sand blasting, grinding, or other suitable means.

As the solid-centered construction of the rectangularly-shaped core disclosed and of concern in the Lohse reference is essentially the same as the toroids disclosed by Weber, it is not surprising that Lohse appreciated that sand blasting, as well as a laser beam, could be utilized to form either a partial or complete air gap in such a core without either cracking the core, or endangering the external windings that are physically spaced from the air gap.

None of such prior art, however, suggests or provides an understanding of how the inductance of a completely assembled inductive device, having a pre-established central air gap and coil assembly, both of which are substantially enclosed by relatively thin, outer core walls, could be precisely adjusted dynamically not only without the need of a tuning slug, but without fracturing the core, and/or adversely affecting the coil assembly housed therewithin.

SUMMARY OF THE INVENTION

In accordance with the principles of the present invention, several unique high energy beam machining methods are employed for adjusting the inductance of inductive devices of the type having a sectioned core that substantially encloses the coil means, and forms a central air gap within the latter (so as to reduce flux leakage and fringing effects).

Considered more specifically, in one preferred embodiment, the core of the inductive device is formed by two cup-shaped core sections, with each having an inwardly extending, tubular leg portion, with the space between the terminating ends of both leg portions defining the central air gap therebetween. The inductance of the device is adjusted in accordance with one preferred method by directing a high energy beam, such as from a laser, into the axial bore of one of the leg portions at an angle relative to the axis thereof and, thereafter, rotating the beam and core relative to each other so that the beam impinges upon, and machines the inner wall adjacent the terminating end of one of the core leg portions along at least a partial arc. This produces an outwardly tapered core leg end section that has the profile of at least a partial frustum. Such a machining operation effectively alters the physical dimensions of the air gap and, thereby, alters the reluctance thereacross and, hence, the inductance of the device.

The amount of core leg material that must be removed in a given device will depend, of course, on the change in air gap reluctance required to produce the desired inductance to be exhibited by the device when energized.

In accordance with an alternative cup-shaped core construction conducive to inductance tuning by beam machining in the manner described above, at least one of the core leg portions is formed at the terminating end with an inwardly extending, laterally disposed flange. This allows a laser beam to be directed into the bore of the chosen core leg portion along a path substantially parallel to the axis of the bore in order to machine away a portion of the flange. As a result, a lower power beam source may often be employed with the modified core construction in question.

The present beam machining methods, applicable for use with cup-shaped cores of either conventional construction, or of the modified constructions embodied herein, not only obviates the need for machine grinding one or both of the core sections prior to their assembly, but obviates the prior need of a tuning slug (and an associated sleeve) to precision tune inductive devices of the type in question.

The beam source, whether of the electron or laser type, may be readily mounted on an X-Y table above a transporting carrier that supports and indexes the inductive devices in incremental fashion into underlying alignment with the trajectory of the generated beam. Alternatively, the position of the optical focusing system may be readily controlled to direct the beam in a programmed manner. Such systems may be readily employed to effect automated, dynamic inductance tuning of energized devices of the type in question.

DETAILED DESCRIPTION OF THE INVENTION

Background of Ferrite Slug Tuned-Transformer with Cup-Shaped Core Sections

Figure 2:
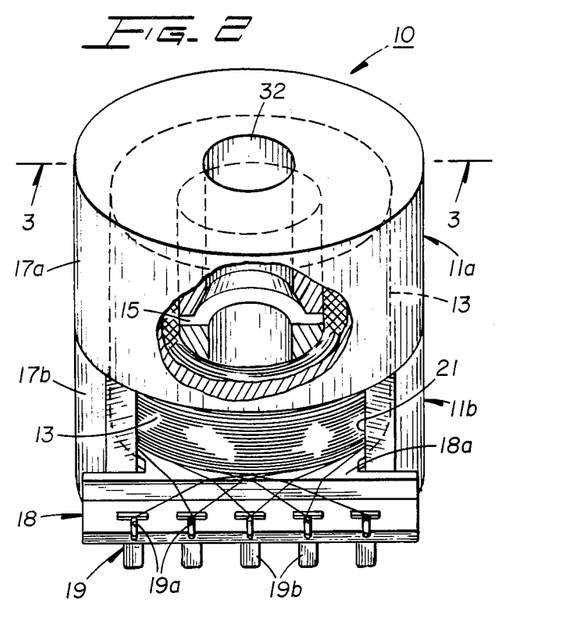
FIG. 2 is a perspective front elevational view of a multi-coil transformer with cup-shaped ferrite core sections, and in a partially broken away portion thereof, illustrates the manner in which the dimensions of the central air gap have been modified, through the use of a high-energy beam machining operation, so as to adjust the inductance of the transformer in accordance with the principles of the present invention.
Figure 3:
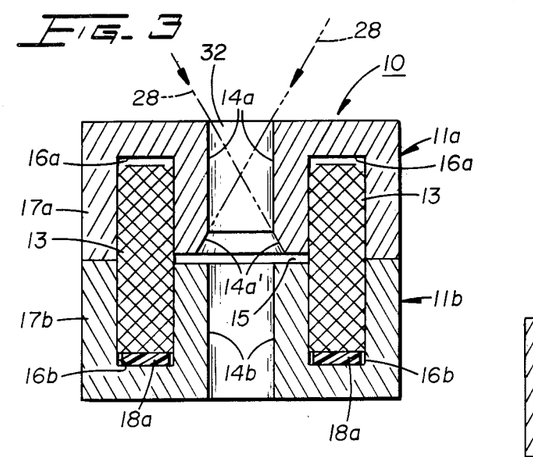
FIG. 3 is an enlarged, detail, cross-sectional view of the transformer taken along the line 3—3 of FIG. 2, illustrating one way in which a high-energy beam may be directed at an inclined angle into the axial bore of one of the core sections so as to impinge upon and machine a tapered surface along the terminating end region of the core leg portion that, in part, defines the air gap.

The methods embodied herein for adjusting the inductance of inductive devices are disclosed, for purposes of illustration, in connection with a transformer 10 of the type depicted in FIGS. 2 and 3, wherein a ferrite core, comprised of two mutually disposed cup-shaped core sections 11a, 11b, substantially encloses at least one, but typically a plurality of superimposed coils identified by the reference numeral 13.

As best seen in FIG. 3, core sections 11a, and 11b are respectively formed with tubular leg portions 14a, 14b, the ends of which define an air gap 15 therebetween. The coils 13 are actually mounted coaxially about the tubular leg portions 14a, b, and confined within aligned core section recesses 16a, 16b formed, in part, by outer mating cylindrically-shaped core walls 17a, b. As thus constructed, it is seen that the core sections 11a, b substantially enclose the coil(s) 13, and define a pre-established central air gap in a region of high flux density.

It is to be understood, of course, that while reference will be generally made to transformers of the type in question hereinafter, the methods of adjusting inductance embodied herein are equally applicable for use with other similarly constructed cores employed in inductive devices such as inductors, filters and memory units.

Figures 7, 8:
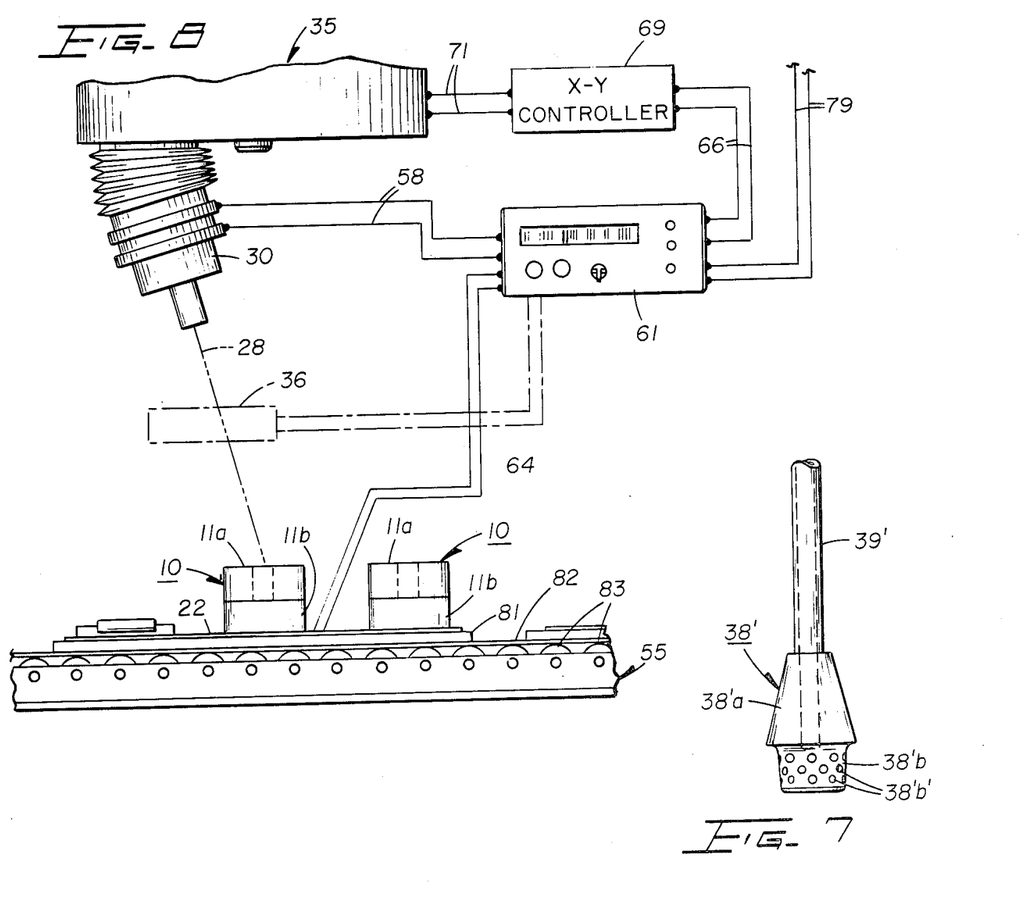
FIG. 7 is an enlarged, detail, perspective view of a beam deflecting member similar to the one depicted in FIG. 4, but distinguishing therefrom by being mounted near the end of a hollow support rod which terminates in a perforated base portion that allows either a cooling medium to pass therethrough, or a vacuum to be established therethrough, in the immediate vicinity of the air gap during the beam machining operation.
FIG. 8 is an enlarged, simplified perspective view of an operating system for aligning circuit board-mounted transformers, for example, beneath a positionally controlled high-energy beam source, employed to inductance-adjust the transformers by a beam-machining operation in an automated, in-line manner in accordance with the principles of the present invention.
Figure 9:
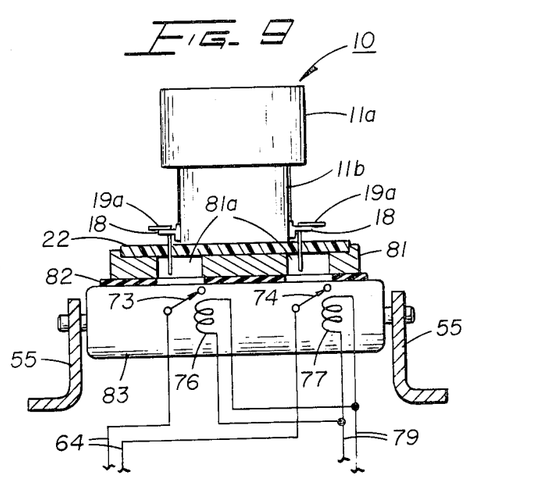
FIG. 9 is an enlarged, detail view, partially in section, of a transformer of the same type as depicted in FIG. 2, mounted on a circuit board, with actuable contacts being employed for connecting the transformer to measuring apparatus during the adjusting of the inductance of the transformer.

With reference again to FIG. 2, a terminal block 18, having terminals 19 mounted in one or more arrays therein, has a major base portion 18a interposed between the lower end of the coil(s) 13 and the inner surface of the end wall of core section 11b. In order to accommodate terminal block 18, the outer wall 17b of core section 11b is formed with at least one, but preferably two mutually disposed notched openings 21 (only one seen). By being L-shaped, the horizontal leg portion 19a of each terminal 19 facilitates either wire wrapped or soldered connections thereto, whereas the downwardly (vertically) extending leg portion 19b allows for the simultaneous insertion of all such leg portions within an array of respectively aligned through-holes of a circuit board 22, for example, such as depicted in FIGS. 8 and 9.

With particular reference to the core 11, it is preferably of the manganese zinc ferrite type that advantageously exhibits a very high permeability and a very high resistivity. As such, the resulting cores are easily magnetized and exhibit relatively low reluctance, as desired in most transformer and inductor applications. Alternatively, the ferrite composition may be formulated and processed so that the resulting cores exhibit very high coercive forces so as to retain their magnetism in a manner similar to bar magnets.

In any event, the ferrite cores are generally composed of the same basic constituents, namely, iron oxide, zinc oxide and manganese carbonate, even though the percentage concentrations thereof, as well as the firing time, temperature and pressing force, may vary appreciably in order to obtain the desired electrical and magnetic characteristics for a given device and/or circuit application.

After the desired formulation of the ferrite composition is pressed into the requisite shape, which is oversized, as previously mentioned, so as to allow for shrinkage in a range typically of from 10 to 20 per cent, the pressed cores are then fired. After being fired, the core material may best be described as falling within a particular class of hard, brittle ceramics which exhibits magnetic properties while physically being of a non-magnetic nature.

As for the cup-shaped construction of the core sections 11a, b, which form the central air gap 15 therebetween, they have gained wide exceptance in many circuit applications, such as involved in tuned-networks for telephone hand sets, for a number of significant reasons. First, the return path for flux provided by the outer walls 17a, b of the core sections is very conducive to obtaining maximized values of inductance for a coil with a given number of ampere turns.

Second, the centrally disposed air gap 15 is positioned at a point of maximum flux so that flux leakage and fringing effects, both of which have a deleterious effect on the maximum value of inductance attainable, are also minimized.

Figure 1:
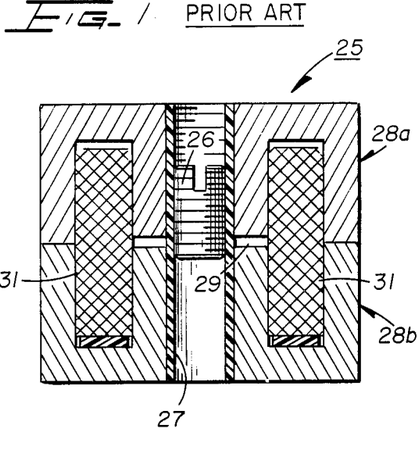
FIG. 1, labeled "prior art", is a cross-sectional view of a typical mating pair of cup-shaped core sections enclosing coil means therewithin, and having a conventional tuning-slug extending within aligned bores of the core so as to be positioned in the area of the central air gap.

The pre-established and axially assembled central location of the air gap 15 also serves two other significant functions. First, it has provided an accessible area in the otherwise essentially closed loop magnetic circuit heretofore in which a ferrite tuning slug could be received. In a prior art transformer 25, so labeled in FIG. 1, such a slug, identified by the numeral 26, normally has required a receiving split sleeve, or bushing, identified by the numeral 27 so as to prevent possible fracture of the unthreaded cores. Unfortunately, both the material costs, and assembly of such slugs and associated sleeves, have heretofore constituted an appreciable portion of the total costs of the assembled inductive device. The prior art transformer is also seen to comprise a pair of conventional cup-shaped core sections 28a, b, defining an air gap 29 and enclosing a coil 31.

A second important function of the air gap employed in sectioned cores of the cup-shaped type is that the finally adjusted reluctance thereacross is several orders of magnitude larger than the reluctance established by the ferrite core itself. This is significant because of the temperature dependence on inductance attributable to the temperature coefficient of the magnetic permeability of the ferrite material. Accordingly, as the air gap produces the major portion of the magnetic circuit reluctance, the air gap tends to dilute, or minimize, the susceptibility of the transformer inductance to change appreciably with temperature because of the ferrite core's inherent temperature coefficient.

Methods for High Energy Beam Tuning of Inductive Devices

In accordance with the principles of the present invention, it has advantageously been found possible to adjust the inductance of core-enclosed coils of inductive devices, such as transformer 10 of FIG. 2, through the use of a positionally controlled high energy beam source. More specifically, either a Q-switched or pulsed YAG laser, for example, may be readily employed to physically change the geometric dimensions of the pre-established central air gap 15. This, in turn, effects a change in both the reluctance across the air gap and the inductance of the device. Such a beam-machined structural modification of the air gap to effect an adjustment of inductance has made possible the elimination of not only the machine grinding operation, but also the ferrite tuning slug, and sleeve.

With particular reference to FIGS. 3 and 8, the beam machining operation is preferably accomplished by directing a high energy beam 28 from a laser 30, for example (see FIG. 8), at a predetermined angle into the bore 32 of the core section 11a, and along an orbital path against the terminating end region of core leg portion 14a, for example, so as to form an end section 14a' that extends outwardly from the inner surface toward the outer surface of the leg portion, and terminates at the air gap-defining end face thereof. As such, the tapered end section 14a' essentially has the profile of at least a partial frustum. Such movement of the beam 28, in conjunction with a properly chosen power level, pulse rate, and focused beam diameter, will structurally modify the air gap to the degree required to adjust the inductance of the device to the desired value, and without any danger of fracturing the machined core section.

Control over the formation of the desired tapered core leg portion is readily accomplished in an automated manner by mounting the laser 30 on an inverted x-y programmed table 35 of conventional design, for example, as depicted in FIG. 8. Alternatively, the beam may be readily controlled by programming the orientation of a focused optic system, represented only symbolically by the phantom lined box 36. As thus controlled, the beam may be precisely directed along an orbital path, and at a predetermined angle relative to the axis of the bore 32 of the core section 11a, so as to form the desired tapered end section 14a' in the core leg 14a.

Figure 4:
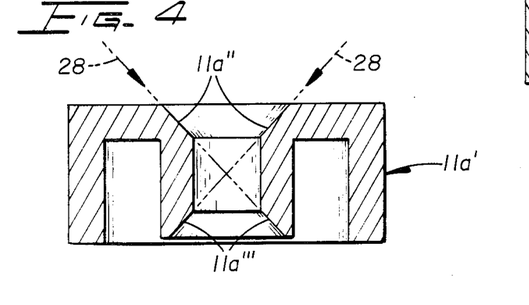
FIG. 4 is an enlarged, detail, cross-sectional view of the upper core section, for example, wherein the outer peripheral edge of the central bore therein is tapered either as formed, or by beam machining after assembly, so as to facilitate a lower angle of beam incidence against the central core leg portion than is otherwise possible with a core section bore of given diameter and length.

A modified core section 11a' is depicted in FIG. 4 wherein the upper peripheral edge of the bore is formed with a beveled surface 11a'' so as to allow a beam to be directed into the bore and impinge upon the inner surface of the air gap-defining core leg section 11a''' at a lower angle of incidence than would otherwise be possible. Such a beveled bore end 11a'' may be formed, of course, either during the pressing of the core, or by the beam at the time that the air gap is to be modified to adjust the inductance of the device. In any event, it is always advantageous to have the beam impinge against the inner surface of one of the core leg portions 14a, b at as low an angle of incidence as possible (ideally perpendicularly thereto), because a lower power beam and much simpler optics can then be used than in a situation where the beam is required to be directed against a portion of the core at some very high angle of incidence.

Figure 5:
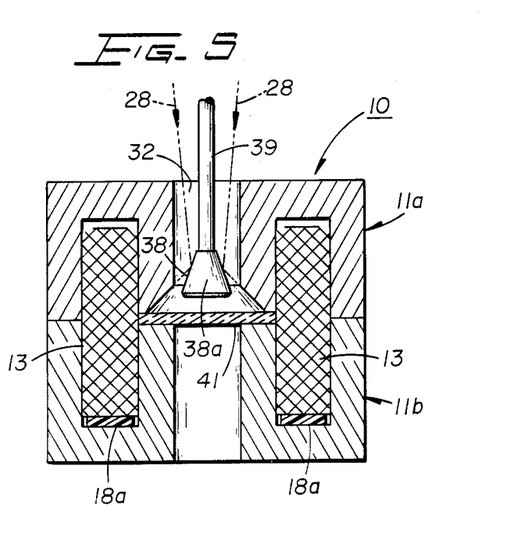
FIG. 5 is a cross-sectional view similar to FIG. 3, but further illustrating an alternative technique for directing a high-energy beam against the terminating end region of one of the central core leg portions so as to adjust the reluctance across the air gap and, in turn, the inductance of the transformer.

In order to effect an even lower angle of incidence of the beam against the inner wall of the tubular leg portion than is possible with a core section constructed as depicted in FIG. 4, reference is made to FIG. 5 wherein a frustumshaped member 38 is positioned within the bore 32 of a core section 11a, identical to the one depicted in FIG. 3, so as to be adjacent the air gap 15. The beam deflecting member 38 is formed with a highly polished, circumferentially disposed and angularly oriented mirror-like surface 38a. The deflecting member 38 is preferably mounted on an adjustable support rod 39. Member 38, of course, may not only comprise a deflecting mirror, but a prism having the requisite profile for deflecting the beam against the terminating end region of the core leg portion 14a at the desired angle. The beam deflecting member 38 could, of course, take many other different configurations, and be formed of many different body materials if the outer surface is to function only as a mirror.

In order to prevent any unvaporized core material, in the form of residue, from falling either to the bottom side of the aligned bores onto a supporting substrate, such as a circuit board, or falling through the space defining the air gap 15 into the recesses 16a, b accommodating the coil(s), a non-magnetic membrane, such as a plastic film 41, may be interposed between the terminating ends of the leg portions 14a, b defining the air gap 15, as depicted in FIG. 5. Such a membrane may be readily cemented to one or both core sections during the assembly thereof.

FIG. 7 depicts a beam deflecting member 38' that incorporates an upper beam deflecting portion 38'a and a lower base portion 38'b as a part thereof. The base portion has a plurality of apertures 38'b' formed therein that communicate with an open end of a hollow tubular support member 39'. The apertured base portion 38'b selectively allows either a vacuum to be established therethrough, so as to remove any unvaporized core material, or a cooling medium, such as air, to be directed therethrough and against the terminating core leg portion being machined. As will be described in greater detail hereinafter, it may be desirable in certain inductance adjusting applications, to cool the area of the core section being machined in order not only to minimize the possibility of fracture, but to insure the adjustment of inductance to a precise value that will be consistently attained thereafter under normal operating conditions.

Figure 6:
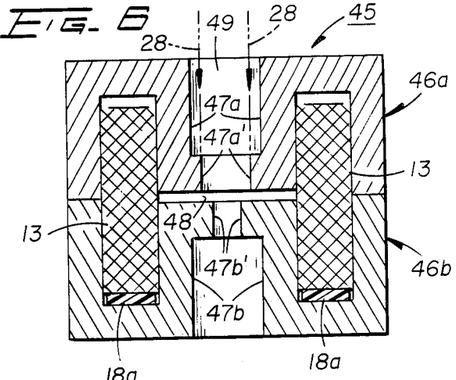
FIG. 6 is an enlarged, detail, cross-sectional view of an alternative transformer embodiment wherein the terminating ends of both core sections are initially formed with inwardly and laterally disposed flange portions so as to facilitate a low power beam being directed perpendicularly thereagainst to machine the latter and, thereby, adjust the inductance of the transformer.

FIG. 6 depicts an alternative transformer 45 wherein upper and lower cup-shaped core sections 46a, b, respectively have tubular, leg portions 47a, b. The terminating ends of the leg portions are formed with laterally disposed, and inwardly extending flange portions 47a', 47b', that define an air gap 48 therebetween.

The flanges readily allow a high energy beam 28 to be directed downwardly through the central bore 49 of the core section 46a so as to impinge against the upper surface of the flange portion 47a' at an angle substantially perpendicular thereto, for the purpose of cutting back or removing a required portion thereof. It is appreciated, of course, that whenever the laser beam can be directed against the core section to be machined in a substantially perpendicular direction thereto, a lower power beam and much simpler optics can be used than when a beam is required to be directed against such a surface at a sharp angle of incidence. In all other respects, the transformer 45 is identical to the transformer 10 of FIGS. 2 and 3.

Advantageously, by beam machining only the terminating end region of one of the core leg portions in accordance with all of the methods and core constructions embodied herein, the danger of the beam accidently penetrating through a core wall is substantially minimized, if not eliminated. As such, the beam under normal operating conditions will never impinge upon and, thereby, impair or possibly destroy the coil(s) 13 enclosed within the core.

The amount of material that must be cut back or removed from at least one of the core legs in adjusting the inductance of a given inductive device will depend, of course, on how far off the initial value of inductance is relative to a desired nominal value thereof. Considered another way, in accordance with the principles of the invention, the degree and length of taper (or cut back area) beam-machined into the terminating end region of one of the core leg portions will be dependent on the effective dimensional change actually required in the air gap so as to increase the reluctance of the core to a value that will produce the desired inductance to be exhibited by the device when energized in a normal circuit environment.

With respect to the laser machining of ferrite cores of the type illustrated herein, it has been found that either Q-switched or pulsed YAG lasers are preferred for that purpose. Lasers operated in a continuous mode are normally not practicable for such a machining operation because of the fact that ferrites, as ceramics, have moderate thermal conductivities and low tensile strengths, as well as high elastic moduli. As a result, a continuous high energy laser beam would normally cause melting damage in the core during the machining of the air gap. Such damage, in many cases, would prove sufficient to induce a fracture in the ferrite core section being machined as a result of the high thermal stresses established therein.

In accordance with one illustrative experimental example, a pulsed YAG laser, generating a beam with a pulse duration of 2ms, and an average energy per pulse of about 6 joules, focused through a lens of 48mm focal length, was found effective in cleanly machining away core leg material so as to produce the desired tapered end section partially defining the air gap 15. Such a beam had negligible effect on the lower core section 14b. Because of the relatively small diameter of the bore of the core, and the central location of the air gap 15, a large angle of incidence between the path of the beam and a line perpendicular to the inner core leg portion surface, measuring about 75° in the illustrative example, was required. It should be noted that the laser machining threshold at this large angle of incidence does not increase as a function of the square of the secant as required by the area law.

In accordance with a second illustrative example, a still deeper cut (or taper) was readily obtained by utilizing a pulsed YAG laser having a pulse duration of 3.5ms, that produced an average energy of 7.5 joules per pulse. In both of the above experimental examples, beam overlap of approximately 50% was used.

While some non-volatilized debris did occur during the laser machining operation, this debris is easily removed by a downward air current which provides a strong turbulence in the region of the air gap. Either one or more properly positioned external air nozzles (not shown), or a combination beam deflector and nozzle member, such as 38', depicted in FIG. 7, could be employed to remove any core debris. No unbound ferrite debris was found in the air gap region, or in the aligned bores themselves, when forced air was employed.

As an added precaution against any unvaporized ferrite residue falling within the coil area defined by the core sections 11a and b, the aforementioned non-magnetic plastic membrane 41, depicted in FIG. 5, for example, may be interposed between the terminating leg portions of the core sections defining the air gap 15.

The use of forced air (or some other suitable gaseous medium) also serves another salutary purpose, namely, to cool the inductive device. More specifically, the machining process quite naturally increases the temperature of the whole transformer assembly. Without any means of forced cooling, the temperature of transformer 10, for example, may increase to about 120° F to 130° F. While this rise in temperature is well within the temperature requirements for most assembled inductive devices, the resonant frequencies of a typical end use transformer tank circuit may be undersirably shifted due to the different temperatures encountered during the measuring operation, for example. For that reason, forced air cooling is recommended. However, because of the relatively large heating capacity of a transformer of the type illustrated herein, the change in temperature thereof is relatively uniform, and, therefore, an electronic compensating circuit may be readily incorporated into the inductance measuring system to increase the accuracy of the measurements in a well known manner.

Figure 10:
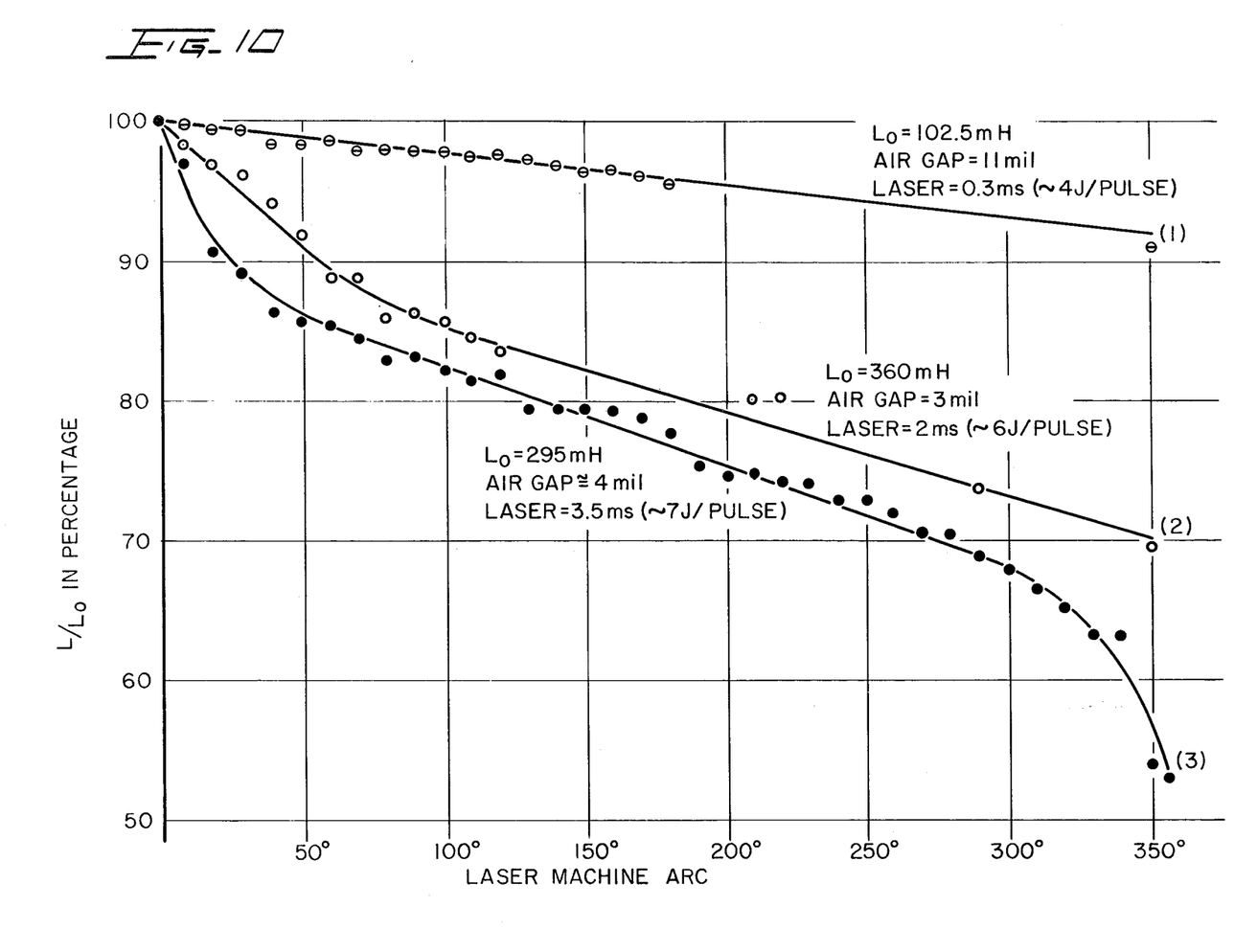
FIG. 10 is a graph illustrating plotted laser-machined values of inductance produced under several different laser operating conditions in accordance with the principles of the present invention for a sectioned transformer of the type depicted in FIGS. 2-6.

Experimental measurements of the percentage change of inductance as a function of the machined arc size of the tapered core leg portion are depicted in FIG. 10. More specifically, the curves designated 1 through 3 were established from plotted data established with three different sets of YAG laser operating conditions, involving pulse durations of 0.3ms, 2ms and 3.5ms, and average energy levels per pulse of 4, 6 and 7 joules, respectively. From these results, it can be seen that tuning at high speeds (large percentage changes in inductance per unit pulse), and with high accuracy (small but highly controllable percentage changes in inductance per unit pulse) can be obtained by simply controlling the duration and/or energy level of the pulses.

Notwithstanding the amount of core material removed, and the elevated temperatures encountered during the machining of the terminating core leg portions, no serious weakening of the machined core sections was noticed during subsequent handling. Equally important, no micro-cracks were observed in any of the machine-tapered core leg portions, or in any other wall portions of the core sections. Also, no damage to the coils 13 was detected at any time.

From an examination of curve 3 of FIG. 10, it becomes readily apparent that changes in inductance as high as 50% or more may be readily obtained by laser machining a terminating leg portion of one or the core sections in an arc approaching or equaling 360°. It thus becomes readily apparent that by using a relatively high power pulsed YAG laser with a high repetition rate, automatic tuning at high speed (in the order of 1 second per transformer) and high accuracy (in the order of one part per thousand) is readily possible in accordance with the principles of the present invention.

In order to optimize the amount of ferrite core material to be both removed and vaporized within a given period of time, an even more powerful laser, such as of the Q-switched $CO_2$ type, may be employed under specially controlled conditions, and for cores having appreciable dimensions. In many beam machining applications of the type in question, however, such a laser may frequently induce cracks in the machined core section. In this connection, it should be appreciated that it is not only the power level of the laser, but the wavelength at which it operates that determines the amount of energy that must be absorbed by the core and, hence, the amount of heat generated in and material removed therefrom.

As previously mentioned, electron beams may also be employed for the inductance tuning-air gap-machining operation described herein. Laser beams of the preferred type described hereinabove, however, have the advantage of being effective in normal work environments, whereas an electron beam necessarily requires a vacuum enclosure. As such, a laser beam system for adjusting the inductance of inductive devices of the type and in the manner illustrated herein is normally much less expensive and simpler than electron beam counterparts.

In addition, with respect to machining ferrite cores, a laser beam also has a number of advantages over a stream of abrasive particles. For example, a laser beam may not only be more sharply focused and precisely controlled, but be effectively deflected. Equally significant, a laser beam can also vaporize a substantial portion of the ferrite core material being removed, as the heat generated by the beam is highly localized in the immediate vicinity of the beam-machined core area.

The adjustment of transformers 10 on a production line basis, and in an automated manner, may be readily accomplished with a carrier 55 (FIG. 8) which successively indexes each transformer beneath the laser 30. With such a transporting carrier system, the upper core section 11a of each transformer may be accurately aligned successively, relative to the initial position of the laser beam 28, at the beginning of each inductance tuning operation.

With respect to the period of time during which the laser 30 is energized, this may be readily controlled by having the laser power source responsive to appropriate signals supplied through leads 58 from an inductance measuring system 61 of conventional design. The measuring system 61, in turn, is connected through leads 64 to at least two terminals 19 associated with one of the coils 13 of the transformer 10 (see FIG. 2), so as to measure the value of inductance exhibited by the transformer, typically energized through associated printed circuit connections (not shown). During such a measuring period, and assuming that the value of inductance is on the upper side of an acceptable inductance range, a signal from the measuring system 61 is applied over leads 64 to energize laser 30. The measuring system 61, in response to measuring a value of inductance (either directly or indirectly) falling within predetermined acceptable limits, then effects the de-energization of laser 30.

The measuring system 61 may similarly apply appropriate signals through leads 66 to a conventional x-y controller 69 which, in turn, produces pre-programmed signals over leads 71 to the x-y table 35, so as to control the position of laser 30 and hence, the path of travel of the beam generated thereby. Such a composite control system is thus seen to function as a closed-loop servo system wherein the measuring system 61 produces the necessary control signals to operate the x-y table 35 and laser 30 in a sequential manner, with the timed sequence of operations preferably being correlated with the indexing rate of the carrier 55.

In connection with the operation of both laser 30 and x-y controller 69, the control signals respectively applied thereto may be of the type to effect a gradual increase and decrease in beam power, and/or x-y table displacement, at the beginning and near the end of each beam-machining period. In such a variably controlled system, the magnitude of beam power and the rate of displacement of the x-y table could be made directly dependent, for example, on the degree of disparity between the initially measured value of inductance and the final desired value thereof. Automated control of the beam in the z direction may similarly be effected, if desired, by appropriate signals from the measuring unit being applied to an x-y-z converter, with the latter controlling a conventional x-y-z table (not shown).

It should also be appreciated that two or more composite inductance tuning systems of the type depicted in FIG. 8 may be positioned in tandem, and independently associated with different inductive devices to be tuned or adjusted. The relatively low costs of the lasers 30 required for such an adjusting operation makes plural systems particularly attractive in high volume manufacturing applications. In this connection, plural laser machining systems, of course, may likewise be used simultaneously to adjust the inductances of two or more associated devices mounted on the same circuit board, for example, and interconnected in a common circuit. In this latter case, it may be desirable to interrelate the measured readings so as to allow the composite control system to adjust the inductances of the associated devices at either the same or different rates, depending upon the operating parameters of the devices, the operating requirements of the energized circuit, and/or on the initial values of inductance exhibited by each device being monitored.

Regardless whether the transformers 10 are adjusted in succession singularly or in groups, there must be a mechanism to readily connect the measuring system 61 to the appropriate terminals 19 of each transformer in order to adjust the inductance thereof in an automated manner. By way of illustration, this is accomplished, as depicted in FIG. 9, through the use of a pair of relay-actuated contacts 73, 74 which are operated in response to the energization of a pair of respectively associated relay coils 76, 77, each time a new circuit board 22 is indexed into the requisite position. The relay coils are energized by appropriate signals applied thereto over leads 79 from the measuring system 61. In order to facilitate terminal clearance along the carrier 55, and to allow contact of selected terminals with the movable contacts 73, 74, each circuit board 22 is mounted on a separate one of a plurality of spaced platforms 81. As depicted, the platforms are, in turn, secured to a carrier belt 82 in a uniformly spaced array, with the belt transported over rollers 83, forming part of the carrier 55, by a power source (not shown) in a well known manner. Each platform 81 is formed with suitable recesses 81a on the underside thereof so as to accommodate the terminals 19, movable contacts 73, 74 and any other circuit terminations on the underside of 74, circuit board 22.

It should be understood, of course, that more than two terminals, or variable selective combinations thereof, may be connected to the measuring system 61 by simply utilizing and actuating the desired number of respectively aligned contacts required for a given inductance measuring application. It is also appreciated that any one of a number of other techniques may be employed to selectively interconnect the measuring system 61 and the appropriate terminals 19 in a program-controlled and automated manner.

In summary, very reliable, inexpensive and efficient core machining methods, and systems therefore, have been disclosed herein for fine-tuning or broadly adjusting the inductance of inductive devices of the type having sectioned cores which sufficiently enclose coil means therewithin, and wherein the mating core sections form a pre-established central air gap. Such inductance-adjusting is accomplished by utilizing either an electron or laser beam to modify the geometric dimensions of the central air gap of the inductive device. Such beams not only allow the core material removed to be precisely controlled, but result in a substantial portion of the removed material being vaporized by the heat generated, while at the same time not inducing fracture of the machined core section.

What is claimed is:

1. A method of adjusting inductance to a predetermined value without the need of a tuning slug in an inductive device having a ferrite core formed of two cup-shaped sections, each section including a tubular leg portion, with said leg portions being mutually disposed and having axially aligned bores extending therethrough, the terminating ends of which are formed with predetermined end face dimensions, and define a centrally located air gap therebetween, and wherein coil means is coaxially positioned about the core leg portions in close proximity to the air gap so as to reduce flux leakage and fringing effects, and wherein relatively thin, integral outer wall portions of the sectioned core provide both a substantially enclosing housing for said coil means and a return path for magnetic flux when assembled, said method comprising the steps of:
   directing a high energy, focused beam from an energized laser source downwardly into the axial bore of one of said leg portions so as to impinge upon a terminating end region thereof;
   moving said beam and inductive device relative to each other so as to remove a portion of the core material forming the terminating air gap-defining end face of said one leg portion to thereby form a tapered leg portion section that extends outwardly from said end face, and which effects a change in reluctance across said air gap, the resulting change in the geometrical dimensions of said terminating end face being dependent on the amount of core material that must be removed therefrom so that said altered central air gap will increase the reluctance of the magnetic circuit provided by said core to a value that produces the desired inductance exhibited by said device when energized;
   applying a predetermined voltage to said inductive device while material is being removed from said one core leg portion by said laser beam, and
   measuring the magnitude of an electrical parameter correlated with the inductance of said device, while core material is being removed therefrom, and removing said beam when a predetermined value of said electrical parameter is obtained.

2. A method of adjusting inductance to a predetermined value without the need of a tuning slug in an inductive device having a sectioned core with two tubular leg portions having axially aligned and mutually disposed bores extending therethrough, the terminating end of each of said leg portions being formed with an inwarding extending, laterally disposed and integral flange, the resulting mutually disposed flanges defining the geometrical dimensions of a centrally located air gap therebetween, and wherein coil means is coaxially positioned about the core leg portions in close proximity to the air gap so as to reduce flux leakage and fringing effects, and wherein relatively thin, integral outer wall portions of the sectioned core provide both a substantially enclosing housing for said coil means and a return path for magnetic flux when assembled, said method comprising the steps of:
   directing a high energy, focused beam from an energized source downwardly into the axial bore of one of said leg portions so as to impinge upon a terminating end region thereof, and
   moving said beam and inductive device relative to each other so as to remove a portion of the core material forming the terminating air gap-defining flanged end face of said one leg portion to thereby effect a change in reluctance across said air gap, the resulting change in the geometrical dimensions of the flange of said one leg portion relative to the other of said flanges being dependent on the amount of core material that must be removed therefrom so that said altered central air gap will increase the reluctance of the magnetic circuit provided by said core to a value that produces the desired inductance exhibited by said device when energized.

3. A method in accordance with claim 1 further comprising the step of:
   removing any unvaporized core material in the immediate vicinity of the air gap caused by the beam machining of said one core leg portion.

4. A method in accordance with claim 1 further comprising the step of:
   deflecting said beam from a first angle of trajectory, while entering the bore of said one tubular leg portion, to a second angle of trajectory that causes said beam to impinge upon the terminating end region of said one core leg portion at a substantially lower angle of incidence than is possible along said first angle of trajectory.

5. A method in accordance with claim 1 further comprising the step of:
removing any unvaporized core material in the immediate vicinity of the air gap caused by said beam machining said one core leg portion, and compensating for the effect on inductance caused by said beam increasing the temperature of said device.

6. A method in accordance with claim 1 wherein said inductive devices are mounted on circuit boards and interconnected to associated energized circuitry thereon while the inductance of each aligned inductive device is being adjusted by said laser beam.

7. A method in accordance with claim 6 further including the step of:
incrementally advancing a plurality of circuit board-mounted inductive devices in succession along a predetermined path, and wherein said relative movement between said beam and each aligned inductive device is effected by moving said laser beam in a programmed manner relative to said inductive device.

8. A method in accordance with claim 7 wherein at least two laser beams are employed to independently adjust the inductance of two inductive devices during the incremental advancement of said devices along said predetermined path.

9. A method in accordance with claim 7 further comprising the steps of:
removing any unvaporized core material caused by said beam machining the terminating end region of said one core leg portion, while compensating for the effect on inductance caused by said beam increasing the temperature of said device, and
deflecting said beam from a first angle of trajectory within the bore of said one leg portion to a second angle of trajectory that allows said beam to impinge against the terminating end region surface of said one leg portion at a substantially lower angle of incidence than is possible along said first angle of trajectory 10. A method in accordance with claim 9 wherein said beam is deflected by means incorporating a nozzle through which a cooling gaseous medium is forced and directed against the terminating end region of at least said one leg portion being machined.

11. A method of adjusting the inductance of an inductive device to a predetermined value wherein said device includes a magnetic core of ferrite material initially formed as two cup-shaped sections, each section having a tubular central leg portion extending a predetermined distance perpendicularly from one side of an integral circular base portion, with each leg portion having an air gap-defining end face of initial predetermined dimensions, and an axial bore extending through said associated base portion, and each section further having an outer arcuate wall portion which extends from said base portion in parallel, spaced and at least partially coaxial relationship with said tubular leg portion so as to define an annular space therebetween for accommodating coil means, said method comprising the steps of:
positioning said core sections in mating relationship during assembly so that the outer peripheral edges of said respective arcuate wall portions are in contacting relationship, and said terminating end faces of said respective tubular leg portions are mutually disposed so as to establish a central air gap therebetween providing an initial reluctance to magnetic flux that is lower than desired;
forming the outer periphery of the axial bore in said one leg portion with a beveled surface so as to facilitate the entry of a high energy beam within said bore at a lower angle of incidence than would otherwise be possible relative to the axis thereof;
directing a high energy, focused beam from an energized laser source downwardly into the axial bore of one of said core leg portions so as to impinge upon a terminating end region thereof, and
moving said beam and inductive device relative to each other so as to remove a portion of the core material forming the terminating air gap-defining end of said one leg-portion to thereby form a tapered section which effects a change in reluctance across said air gap, said tapered section extending outwardly from the inner surface toward the outer wall surface of said one tubular leg portion, and terminating at the air gap-defining end face thereof, said tapered section having the profile of at least a partial frustum, the resulting change in the geometrical dimensions of the end face of said one leg portion being dependent on the amount of core material that must be removed therefrom so that said altered central air gap will increase the reluctance of the magnetic circuit provided by said core to a value that produces the desired inductance exhibited by said device when energized.

12. A method of adjusting the inductance of an inductive device to a predetermined value wherein said device includes a magnetic core of ferrite material initially formed as two cup-shaped sections, each section having a tubular central leg portion extending a predetermined distance perpendicularly from one side of an integral circular base portion, with each leg portion having an air gap-defining end face of initial predetermined dimensions, and an axial bore extending through said associated base portion, and each section further having an outer arcuate wall portion which extends from said base portion in parallel, spaced and at least partially coaxial relationship with said tubular leg portion so as to define an annular space therebetween for accommodating coil means, said method comprising the steps of
positioning said core sections in mating relationship during assembly so that the outer peripheral edges of said respective arcuate wall portions are in contacting relationship, and said terminating end faces of said respective tubular leg portions are mutually disposed so as to establish a central air gap therebetween providing an initial reluctance to magnetic flux that is lower than desired;
directing a high energy, focused beam from an energized laser source downwardly into the axial bore of one of said core leg portions so as to impinge upon a terminating end region thereof;
moving said beam and inductive device relative to each other so as to remove a portion of the core material forming the terminating air gap-defining end of said one leg portion to thereby form a tapered section which effects a change in reluctance across said air gap, said tapered section extending outwardly from the inner surface toward the outer wall surface of said one tubular leg portion, and terminating at the air-defining end face thereof, said tapered section having the profile of at least a partial frustum, the resulting change in the geometrical dimensions of the end face of said one leg portion being dependent on the amount of core material that must be removed therefrom so that said altered central air gap will increase the reluctance of the magnetic circuit provided by said core to a value that produces the desired inductance exhibited by said device when energized;

applying a predetermined voltage to said inductive device while material is being removed from said one leg portion of said core by said laser beam, and measuring the magnitude of an electrical parameter correlated with the inductance of said device, while core material is being removed therefrom, and removing said beam when a predetermined value of said electrical parameter is obtained.

13. A method in accordance with claim 12 wherein said coil means comprises at least two magnetically coupled conductive coils confined within said annular space of said core, and further comprising the step of:

removing any unvaporized core material in the immediate vicinity of said air gap caused by said beam, and at least in part controlling the temperature rise of said core as a result of said beam impinging thereupon by applying a cooling gaseous stream against the core in the immediate area of the air gap.

14. A method in accordance with claim 13 wherein said inductive devices are mounted on circuit boards and interconnected to associated energized circuitry thereon while the inductance of each aligned inductive device is being adjusted by said laser beam, said method further comprising the step of:

incrementally advancing a plurality of circuit board-mounted inductive devices in succession along a predetermined path, and wherein said relative movement between said beam and each aligned inductive device is effected by moving said laser beam in a programmed manner relative to said inductive device.

15. A method in accordance with claim 14 wherein said step of removing any unvaporized material is effected by positioning nozzle means within the bore of said core leg portion being machined, and in the immediate vicinity of said air gap, with said cooling gaseous medium being forced therethrough, and wherein said nozzle means further includes an adjustable, circumferentially disposed and angularly oriented mirror-like surface for deflecting said beam at a relatively abrupt angle at the region of said one core leg portion from which core material is to be removed.

16. A method of adjusting inductance to a predetermined value without the need of a tuning slug in an inductive device wherein at least one coil is substantially enclosed within a recessed area of a magnetic core formed with at least one hollow central leg portion, the terminating end of which defines at least in part, an air gap, and being formed with predetermined end face dimensions, and wherein thin outer wall portions provide both a substantially enclosing housing for said coil and a return path for flux, which comprises the steps of:

directing a high-energy, focused beam from an energized source downwardly into the axial bore of said hollow leg portion so as to impinge upon a terminating end region thereof which, in part, defines said air gap;

moving said beam and inductive device relative to each other to remove a portion of the core material from the terminating air gap-defining end face of said leg portion to thereby increase the reluctance across the air gap to a value that produces the desired inductance exhibited by the device when energized, and removing any unvaporized core material in the immediate vicinity of the air gap caused by the beam machining of said hollow leg portion.

17. A method of adjusting inductance to a predetermined value without the need of a tuning slug in an inductive device wherein at least one coil is substantially enclosed within a recessed area of a magnetic core formed with at least one hollow central leg portion, the terminating end of which defines at least in part, an air gap, and being formed with predetermined end face dimensions, and wherein thin outer wall portions provide both a substantially enclosing housing for said coil and a return path for flux, which comprises the steps of:

directing a high-energy, focused beam from an energized source downwardly into the axial bore of said hollow leg portion so as to impinge upon a terminating end region thereof which, in part, defines said air gap;

moving said beam and inductive device relative to each other to remove a portion of the core material from the terminating air gap-defining end face of said leg portion to thereby increase the reluctance across the air gap to a value that produces the desired inductance exhibited by the device when energized, and deflecting said beam from a first angle of trajectory, while entering the bore of said hollow leg portion, to a second angle of trajectory that causes said beam to impinge upon the terminating end region of said hollow leg portion at a substantially lower angle of incidence than is possible along said first angle of trajectory.

18. A method in accordance with claim 16 wherein said core is made of ferrite material, said beam source comprises a laser, and wherein said ferrite material removed forms a tapered section having the profile of at least a partial frustum 19. A method in accordance with claim 17 wherein said beam is deflected by means incorporating a nozzle through which a cooling gaseous medium is forced and directed against the terminating end region of at least said hollow leg portion being machined.

* * * * *